(12) United States Patent
Wakashiro et al.

(10) Patent No.: US 6,616,570 B2
(45) Date of Patent: Sep. 9, 2003

(54) CONTROL APPARATUS FOR HYBRID VEHICLE

(75) Inventors: Teruo Wakashiro, Shioya-gun (JP);
Atsushi Matsubara, Utsunomiya (JP);
Shinichi Kitajima, Utsunomiya (JP);
Toshinari Shinohara, Utsunomiya (JP);
Yasuo Nakamoto, Utsunomiya (JP);
Shigeo Hidai, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/071,084

(22) Filed: Feb. 11, 2002

(65) Prior Publication Data

US 2002/0115526 A1 Aug. 22, 2002

(30) Foreign Application Priority Data

Feb. 20, 2001 (JP) ........................................ 2001-043930

(51) Int. Cl.$^7$ ............................................. B60K 41/04
(52) U.S. Cl. ........................ 477/5; 123/198 F; 123/481; 180/65.2
(58) Field of Search ............................. 123/198 F, 481; 180/65.2; 477/3, 4, 5

(56) References Cited

U.S. PATENT DOCUMENTS 5,992,153 A * 11/1999 Tsuchihashi et al. ....... 180/65.4
5,992,390 A * 11/1999 Moyer ..................... 123/198 F
6,244,258 B1 * 6/2001 Akiyama et al. ......... 123/198 F
6,257,194 B1 * 7/2001 Kerns et al. .............. 123/198 F
2001/0003971 A1 * 6/2001 Hori et al. .................. 123/481

FOREIGN PATENT DOCUMENTS

JP      2000-97068     4/2000
JP      2000-125405    4/2000

* cited by examiner

Primary Examiner—Richard M. Lorence
Assistant Examiner—Dennis Abdelnour
(74) Attorney, Agent, or Firm—Armstrong, Westerman & Hattori, LLP

(57) ABSTRACT

A hybrid vehicle control apparatus is provided which can improve fuel consumption. There is provided: a cylinder cut-off determination section for determining whether all cylinders should be cut off; a cylinder cut-off cancellation determination section for determining whether cylinder cut-off cancellation conditions have been satisfied; a cylinder cut-off execution section for operating a spool valve when the cylinder cut-off determination section determines that cylinder cut-off is possible; and a cylinder cut-off control section for cutting off the cylinders of the engine based on the operating conditions of the cylinder cut-off determination section, the cylinder cut-off cancellation determination section and the cylinder cut-off execution section. When the voltage of an auxiliary battery, being the drive source of the spool valve, is at or greater than a predetermined voltage, and the oil temperature is within a predetermined range, the cylinder cut-off determination section determines that cylinder cut-off is possible.

15 Claims, 9 Drawing Sheets

CONTROL APPARATUS FOR HYBRID VEHICLE

BACKGROUND OF THE INVENTION

1. Field of the Invention

The present invention relates to a control apparatus for a hybrid vehicle. In particular, the invention relates to a control apparatus for a hybrid vehicle that can improve fuel consumption by cutting off the cylinders (i.e., by closing both intake valves and exhaust valves of an engine) under certain conditions.

2. Description of the Related Art

Heretofore there is known a hybrid vehicle incorporating a motor in addition to an engine as drive sources for vehicle propulsion. One type of such a hybrid vehicle is a parallel hybrid vehicle where the drive output from the engine is assisted by the motor.

In the parallel hybrid vehicle, at the time of acceleration the drive output from the engine is assisted by means of the motor, while at the time of deceleration, various control is carried out such as performing battery charging by deceleration regeneration, so that the remaining charge (electrical energy) of the battery can be maintained while satisfying the requirements of the driver. Furthermore, since the structural mechanism is such that the engine and the motor are arranged in series, the structure can be simplified, and the weight of the whole system can be lightened. Therefore, there is an advantage in that there is a high degree of freedom in vehicle assembly.

Here, for the aforementioned parallel hybrid vehicle, there is a construction in which a clutch is incorporated between the engine and motor (for example, refer to Japanese Unexamined Patent Application, First Publication No. 2000-97068) in order to avoid the influence of engine friction (engine braking) at the time of deceleration regeneration, or the engine, motor and transmission are connected in series (for example, refer to Japanese Unexamined Patent Application, First Publication No. 2000-125405) in order to achieve maximum simplification.

However, in the former construction in which a clutch is installed between the engine and motor, there are disadvantages in that the construction is complicated by the clutch installation and the degree of freedom in vehicle assembly is worsened, and in addition the transmission efficiency of the power transmission system even when running is reduced due to usage of the clutch. On the other hand, in the latter construction in which the engine, motor and transmission are connected in series, since the amount of regeneration is reduced by the aforementioned engine friction, the electrical energy that could be conserved by regeneration is reduced. Therefore, there is a problem in that the amount of driving assistance (assistance amount) and the like by the motor is limited.

Furthermore, for a method of reducing engine friction during deceleration in the former type, there is a method for increasing the amount of regeneration by controlling the throttle valve opening at the time of deceleration using an electronic throttle control system to greatly reduce pumping losses. However, since a large amount of fresh air flows as is into the exhaust system during deceleration, it reduces the temperature of a catalyst and an A/F (air-fuel ratio) sensor, and there is a problem in that optimum exhaust gas control is affected detrimentally.

SUMMARY OF THE INVENTION

Therefore, the present invention provides a hybrid vehicle control apparatus that can achieve a significant improvement in fuel consumption, using motor driving assistance, by reducing the amount of engine friction through performing a reliable cylinder cut-off operation, and can also cut off the cylinders in an optimal state, so that the cylinder cut-off can be quickly cancelled in a case where it is not desirable.

The present invention is control apparatus for a hybrid vehicle with an engine (for example, engine E in the embodiment) capable of cutting off cylinders and a motor (for example, motor M in the embodiment) as drive sources of the vehicle, which performs regenerative braking by the motor depending on a deceleration state when the vehicle is decelerating, comprising: a cylinder cut-off determination section (for example, the processing associated with an all cylinder cut-off standby flag F_ALCSSTB in the embodiment) which determines whether the cylinders should be cut off depending on the running conditions of the vehicle; a cylinder cut-off cancellation determination section (for example, the processing associated with an all cylinder cut-off cancellation condition satisfied flag F_ALCSSTP in the embodiment) which determines whether the cylinder cut-off should be cancelled, depending on the running conditions of the vehicle while the operation of the cylinders of the engine is cut off; a cylinder cut-off execution section (for example, the processing associated with an all cylinder cut-off solenoid flag F_ALCSSOL in the embodiment) which operates an actuator (for example, a spool valve SV in the embodiment) for cutting off the cylinder operation of the engine when cylinder cut-off is determined to be possible by the cylinder cut-off determination section; and a cylinder cut-off control section (for example, the processing associated with an all cylinder cut-off execution flag F_ALCS in the embodiment) which cuts off the cylinders of the engine based on the operating conditions of the cylinder cut-off determination section, the cylinder cut-off cancellation determination section and the cylinder cut-off execution section, wherein when a voltage (for example, voltage VB in the embodiment) of a drive source of the actuator that is operated by the cylinder cut-off execution section is greater than or equal to a predetermined voltage, and a temperature of a medium that acts by the operation of the actuator is within a predetermined range, the cylinder cut-off determination section determines that cylinder cut-off is possible.

With such a construction, it is possible to cut off the operation of the cylinders of the engine by the cylinder cut-off control section after cylinder cut-off is determined to be possible by the cylinder cut-off determination section and the actuator for cutting off the cylinders of the engine is instructed to operate by the cylinder cut-off execution section.

Furthermore, when the cylinder cut-off cancellation determination section judges the cancellation of cylinder cut-off while the operation of the cylinders is cut off, after the cylinder cut-off execution section cancels the operation of the actuator, it is possible for the cylinder cut-off control section to operate the engine normally.

Here, the cylinder cut-off determination section judges that cylinder cut-off is possible only in the case where the voltage of the drive source of the actuator and the temperature of the medium satisfy certain conditions, so that it is possible to prevent switching to cylinder cut-off operation in a case where the voltage of the drive source of the actuator or the temperature of the medium are not adequate. Accordingly, there is an effect of preventing a reduction in the response of the actuator, enabling reliable switching to cylinder cut-off operation.

In the present invention, the cylinder cut-off execution section may apply an oil pressure of a working fluid by operating the actuator, to close both an intake valve (for example, intake valve IV in the embodiment) and exhaust valve (for example, exhaust valve EV in the embodiment) of the engine, and the temperature of the medium may be the oil temperature (for example, oil temperature TOIL in the embodiment) of the working fluid.

With such a construction, the oil temperature of the working fluid is maintained within a predetermined range, adequate actuator response is ensured, and cylinder cut-off can be performed. Therefore, there is an effect that both the intake valve and exhaust valve can be closed reliably.

In the present invention, when an inlet negative pressure (for example, inlet pipe negative pressure PBGA in the embodiment) of an inlet pipe is greater than or equal to a predetermined value that is on the atmospheric pressure side, the cylinder cut-off determination section may determine that cylinder cut-off is possible.

With such a construction, since cylinder cut-off can be performed at a time of low engine load when the inlet pipe negative pressure is greater than or equal to a predetermined value that is on the atmospheric pressure side, it is not necessary to cut off the cylinders at a time of high engine load when cylinder cut-off is not required.

In the present invention, the cylinder cut-off cancellation determination section may determine that cylinder cut-off cancellation is possible when the oil pressure (for example, engine oil pressure POIL in the embodiment) of the working fluid is less than or equal to a predetermined pressure.

With such a construction, there is an effect of preventing operational failure of the actuator in the case where the oil pressure of the working fluid becomes less than or equal to a predetermined pressure, enabling switching to normal operation.

In the present invention, the cylinder cut-off cancellation determination section may determine that cylinder cut-off cancellation is possible when the remaining charge of a battery (for example, battery 3 in the embodiment) that drives the motor is outside of a predetermined range.

This construction prevents failures occurring through being unable to ensure sufficient energy for motor assistance at the time of returning to normal operation in the case where the remaining charge of the battery is outside of a predetermined range, that is, in the case where the remaining charge of the battery is too low. Furthermore, extra regeneration is not required in the case where remaining charge of the battery is too high. Therefore, there is an advantage in energy management.

In the present invention, the cylinder cut-off cancellation determination section may determine that cylinder cut-off cancellation is possible when a gear ratio (for example, previous gear position NGR in the embodiment) is less than or equal to a predetermined value, that is on the low speed side.

With such a construction, there are effects in that regeneration in a region where regeneration efficiency is poor can be avoided, and it is possible to avoid the busy operation due to cylinder cut-off switching (that is, switching being performed frequently) in a low speed region.

In the present invention, the cylinder cut-off cancellation determination section may determine that cylinder cut-off cancellation is possible when the rate (for example, rate of change DNE in the embodiment) of change of the engine speed (for example, engine speed NE in the embodiment) is greater than or equal to a predetermined value.

With such a construction, there is an effect of preventing stalling the engine in the case where the rate of change of engine speed on the decreasing side is greater than or equal to a predetermined value, for example if sudden deceleration is performed to stop a vehicle, enabling switching to normal operation.

In the present invention, the cylinder cut-off cancellation determination section may determine that cylinder cut-off is possible when a clutch of a manual transmission vehicle is determined to be partially engaged.

With such a construction, there are effects of preventing the engine from stalling, for example in the case where the clutch is partially engaged in order to stop the vehicle, and preventing unnecessarily cutting off the cylinders if the gears are changed to accelerate, enabling switching to normal operation.

In the present invention, the cylinder cut-off determination section may determine that cylinder cut-off is possible when an outside air temperature is within a predetermined range. With such a construction, it is possible to prevent the engine from being unstable when all cylinder cut-off is performed.

In the present invention, the cylinder cut-off determination section may determine that cylinder cut-off is possible when a cooling water temperature is within a predetermined range. With such a construction, it is possible to prevent the engine from being unstable when all cylinder cut-off is performed.

In the present invention, the cylinder cut-off determination section may determine that cylinder cut-off is possible when atmospheric pressure is greater than or equal to a predetermined pressure. With such a construction, it is possible to prevent all cylinder cut-off being performed in a state where a sufficient level of the brake master power negative pressure cannot be ensured at the time of brake operation.

In the present invention, the cylinder cut-off cancellation determination section may determine that cylinder cut-off cancellation is possible when vehicle speed is outside of a predetermined range.

In the present invention, the cylinder cut-off cancellation determination section may determine that cylinder cut-off cancellation is possible when engine speed is outside of a predetermined range. With such a construction, in the case where the engine speed is low, it is possible to prevent low regeneration efficiency and the inability to ensure sufficient oil pressure for all cylinder cut-off switching. Also in the case where the engine speed is too high, it is possible to prevent the inability to perform cylinder cut-off switching because the oil pressure is too high due to high engine speed, and an excessive consumption of working fluid for cylinder cut-off.

In the present invention, the cylinder cut-off cancellation determination section may determine that cylinder cut-off cancellation is possible when brake master power internal negative pressure is greater than or equal to a predetermined value. With such a construction, in a case where sufficient brake master power internal negative pressure cannot be obtained, it is possible to prevent all cylinder cut-off from continuing.

In the present invention, the cylinder cut-off cancellation determination section may determine that cylinder cut-off cancellation is possible when a throttle is not fully closed. With such a construction, in the case where the throttle opens even a little from the fully closed throttle state, continuation of all cylinder cut-off is cancelled, thereby enhancing marketability of a vehicle.

DETAILED DESCRIPTION OF THE PREFERRED EMBODIMENTS

Hereunder is a description of embodiments of the present invention with reference to the figures.

Figure 1:
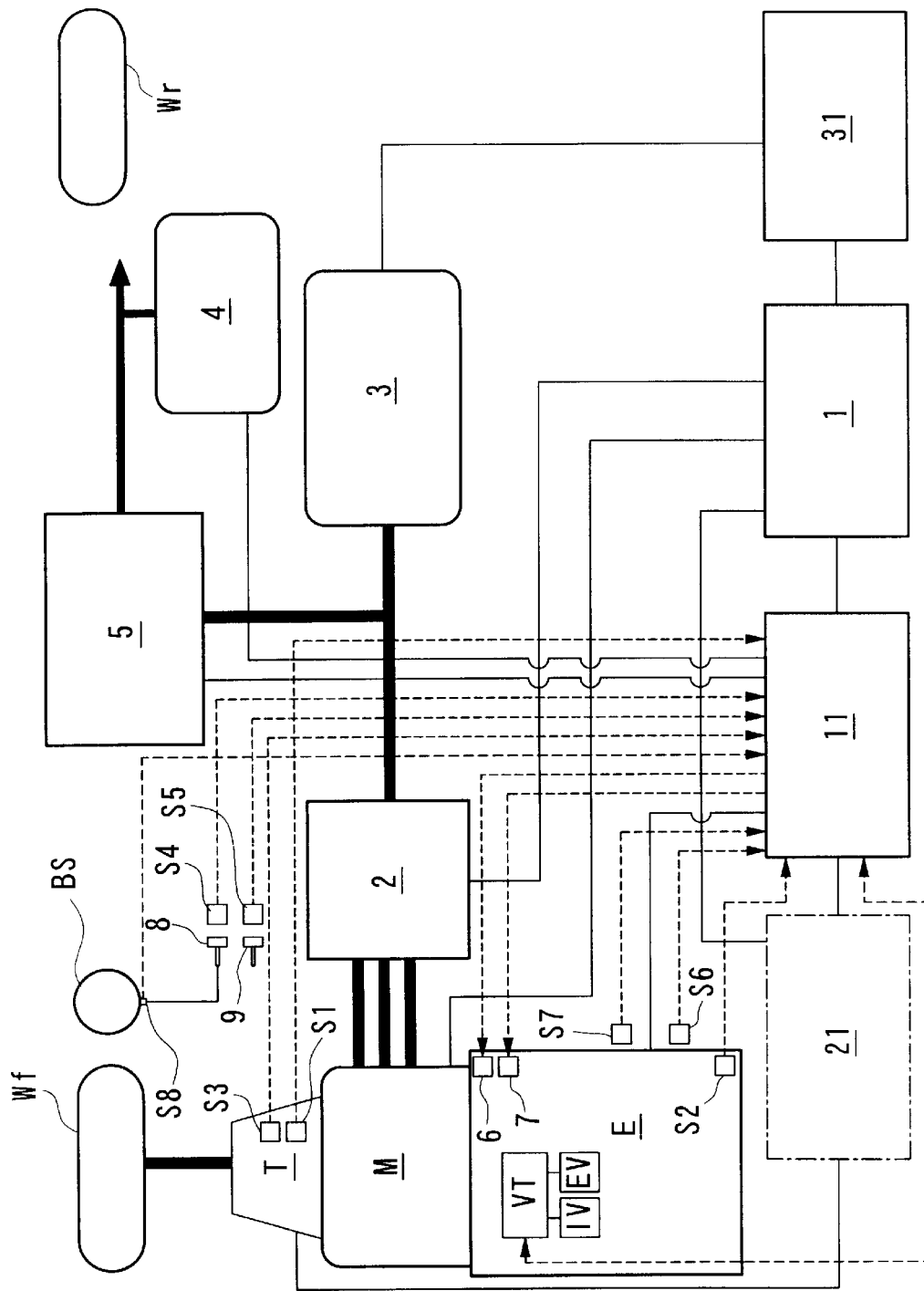
FIG. 1 is a diagram showing a schematic construction of a parallel hybrid vehicle of an embodiment of the present invention.

FIG. 1 shows a parallel hybrid vehicle of an embodiment of the present invention, in which an engine E, a motor M and a transmission T are connected in series. The driving forces from both the engine E and the motor M are transmitted to front wheels Wf serving as drive wheels via the transmission T comprising either an automatic transmission or a manual transmission. Furthermore, when a driving force is transmitted to the motor M from the front wheels Wf, at the time of deceleration of the hybrid vehicle, the motor M functions as a generator to produce so called a regenerative braking force, and the kinetic energy of the vehicle is recovered as electrical energy. The rear wheels are designated as Wr.

The drive and regeneration of the motor M are controlled by a power drive unit 2, which receives control instructions from a motor ECU 1. A battery 3 of a high-voltage system for transferring electrical energy to and from the motor M is connected to the power drive unit 2. The battery 3 is constructed from individual modules wherein, for example, a plurality of cells is connected in series, with a plurality of these modules connected in series. Mounted on the hybrid vehicle is a 12 volt auxiliary battery 4 for driving various auxiliary equipment. This auxiliary battery 4 is connected to the battery 3 via a downverter 5. The downverter 5, which is controlled by an FIECU 11, steps-down the voltage of the battery 3 to charge the auxiliary battery 4.

The FIECU 11, in addition to the motor ECU 1 and the downverter 5, controls the operation of a fuel supply amount control section 6 for controlling the amount of fuel supplied to the engine E, the operation of a starter motor 7, and also the ignition timing. Therefore, inputs to the FIECU 11 are: a signal from a vehicle speed sensor S1 for detecting the vehicle speed V based on the rotational speed of a drive shaft in the transmission T, a signal from an engine speed sensor S2 for detecting engine speed NE, a signal from a shift position sensor S3 for detecting the shift position of the transmission T, a signal from a brake switch S4 for detecting the operation of a brake pedal 8, a signal from a clutch switch S5 for detecting the operation of a clutch pedal 9, a signal from a throttle opening degree sensor S6 for measuring the degree of throttle opening TH, and a signal from an inlet pipe negative pressure sensor S7 for detecting inlet pipe negative pressure PBGA. Numeral 31 denotes a battery ECU that protects the battery 3, and computes the remaining charge QBAT of the battery 3. Here, in the case of a CVT (Continuously Variable Transmission) vehicle, a CVTECU 21 for controlling a CVT is installed as shown by broken lines in FIG. 1.

BS denotes a booster connected to a brake pedal 8, and a negative pressure sensor S8 for detecting the master power internal negative pressure (MPGA) of the brake is installed in this booster BS.

This negative pressure sensor S8 is connected to the FIECU 11.

Here, the abovementioned engine E is a cylinder cut-off engine that is capable of switching between all cylinders operating (normal operation), in which all cylinders operate, and all cylinder cut-off operation, in which all cylinders are cut off. As shown in FIG. 1, typically the intake valve IV and exhaust valve EV of each cylinder of the engine E are constructed such that their operation can be stopped by a variable valve timing system VT. Here, the variable valve timing system VT is connected to the FIECU 11.

A specific description will be given using FIG. 2, FIG. 3A and FIG. 3B.

Figure 2:
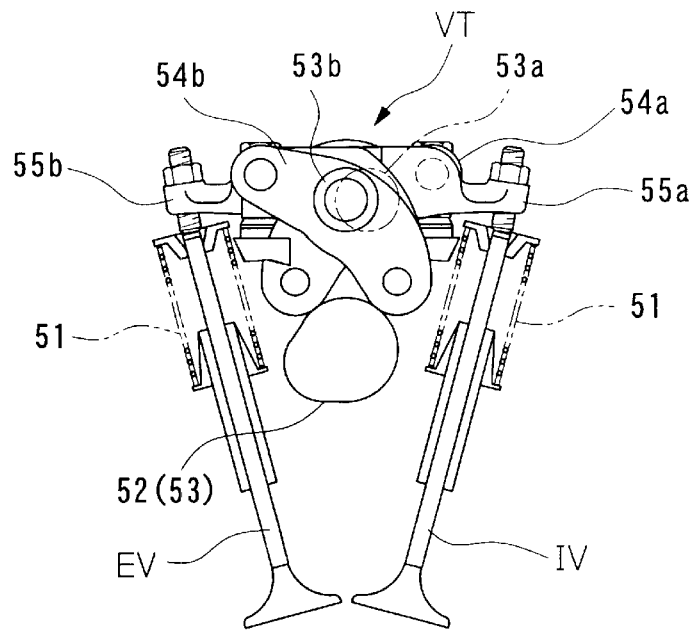
FIG. 2 is a front view of a variable valve timing system of the embodiment of the present invention.

FIG. 2 shows an example in which a variable valve timing system VT for all cylinder cut-off operation is applied in a SOHC (Single Overhead Camshaft) type engine. An intake valve IV and an exhaust valve EV are installed in a cylinder, which is not shown in the figure, and the intake valve IV and exhaust valve EV are urged toward an angle such that the intake and exhaust ports, which are not shown in the figure, are closed by valve springs 51. Also, numeral 52 denotes a lift cam installed on a cam shaft 53. This lift cam 52 is linked to cam lift rocker arms 54a and 54b for intake valve and exhaust valve, mounted so as to be rotatable via rocker arm shafts 53a and 53b for intake valve and exhaust valve.

Furthermore, valve drive rocker arms 55a and 55b are rotatably mounted on each of the rocker arm shafts 53a and 53b, adjacent to the cam lift rocker arms 54a and 54b. The moving ends of the rotatable valve drive rocker arms 55a and 55b press the top ends of the intake valve IV and the exhaust valve EV in order to operate the opening of the intake valve IV and the exhaust valve EV. Here, the base ends (opposite ends from the valve abutting portions) of the valve drive rocker arms 55a and 55b are constructed such that they are able to slide on a circle cam 531 installed on the cam shaft 53.

Figure 3A:
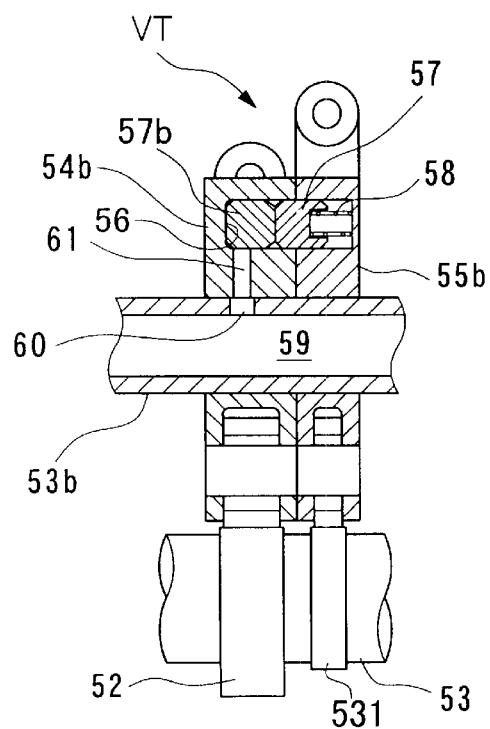
FIG. 3A shows the variable valve timing system of the embodiment of the present invention, being a sectional view of the main parts of the variable valve timing system in an all cylinder operation state.
Figure 3B:
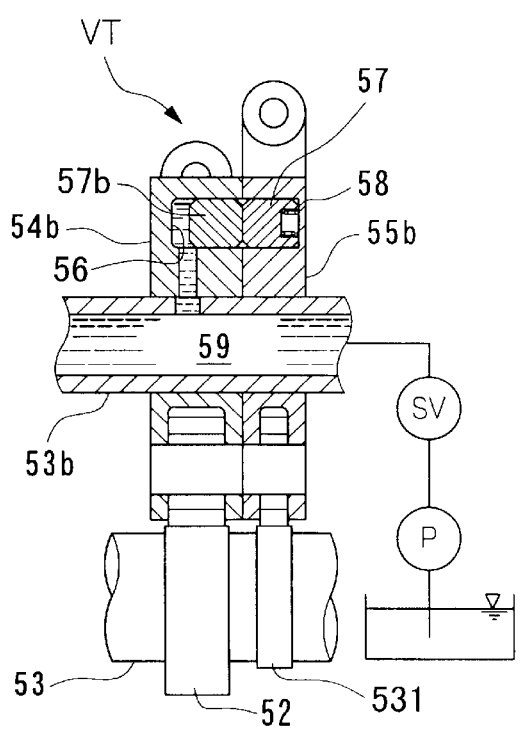
FIG. 3B shows the variable valve timing system of the embodiment of the present invention, being a sectional view of the main parts of the variable valve timing system in an all cylinder cut-off operation state.

FIG. 3A and FIG. 3B shows the cam lift rocker arm 54b and the valve drive rocker arm 55b for the exhaust valve as an example.

In FIG. 3A and FIG. 3B, an oil pressure chamber 56 is formed on the opposite side from the lift cam 52, with the exhaust valve rocker arm shaft 53b in the center, in the cam lift rocker arm 54b and the valve drive rocker arm 55b, which extends over both the cam lift rocker arm 54b and the valve drive rocker arm 55b. Inside the oil pressure chamber 56, a pin 57 and a release pin 57b are installed such that these can be slidable. The pin 57 and the release pin 57b are urged toward the cam lift rocker arm 54b side via a pin spring 58.

Furthermore, an oil pressure supply path 59 is formed inside the exhaust valve rocker arm shaft 53b. This oil pressure supply path 59 is communicated with the oil pressure chamber 56 via an opening 60 of the oil pressure supply path 59 and a communication path 61 of the cam lift rocker arm 54b. Working fluid is supplied from an oil pump P to the oil pressure supply path 59 by switching a spool valve SV serving as an actuator. The solenoid of this spool valve SV is connected to the FIECU 11.

Here, in a case where oil pressure is not applied from the oil pressure supply path 59, as shown in FIG. 3A, the pin 57 is positioned by the pin spring 58 such that it extends between the cam lift rocker arm 54b and the valve drive rocker arm 55b. On the other hand, if oil pressure is applied from the oil supply path 59 by a cylinder cut-off signal, as shown in FIG. 3B, the pin 57 and the release pin 57b slide to the valve drive rocker arm 55b side against the pin spring 58. As a result, the boundary between the pin 57 and the release pin 57b is aligned with the boundary between the cam lift rocker arm 54b and the valve drive rocker arm 55b, thereby releasing the link between these arms. Here, the intake valve side has the same construction.

Accordingly, in the case where the previous conditions for an all cylinder cut-off operation as mentioned later are satisfied, and an all cylinder cut-off cancellation condition is not satisfied, the solenoid of the spool valve SV is driven on (F_ALCS=1) by a signal from the FIECU 11, so that oil pressure is applied from the oil pressure supply path 59 to the oil pressure chamber 56 on both the intake valve and exhaust valve. Then, the pins 57 and the release pins 57b which had linked the cam lift rocker arms 54a and 54b and the valve drive rocker arms 55a and 55b, slide toward the valve drive rocker arms 55a and 55b sides, and the links between the cam lift rocker arms 54a and 54b and the valve drive rocker arms 55a and 55b are released.

As a result, the cam lift rocker arms 54a and 54b are driven by the rotary movement of the lift cam 52. However, the valve drive rocker arms 55a and 55b, whose links with the cam lift rocker arms 54a and 54b by the pins 57 and the release pins 57b were released, are not driven by either the idle running circle cam 531 or the cam lift rocker arms 54a and 54b, and hence they do not contribute to the opening of the valves IV and EV. As a result, the valves IV and EV remain closed, which enables the all cylinder cut-off operation.

[MA (Motor) Basic Modes]

Figure 4:
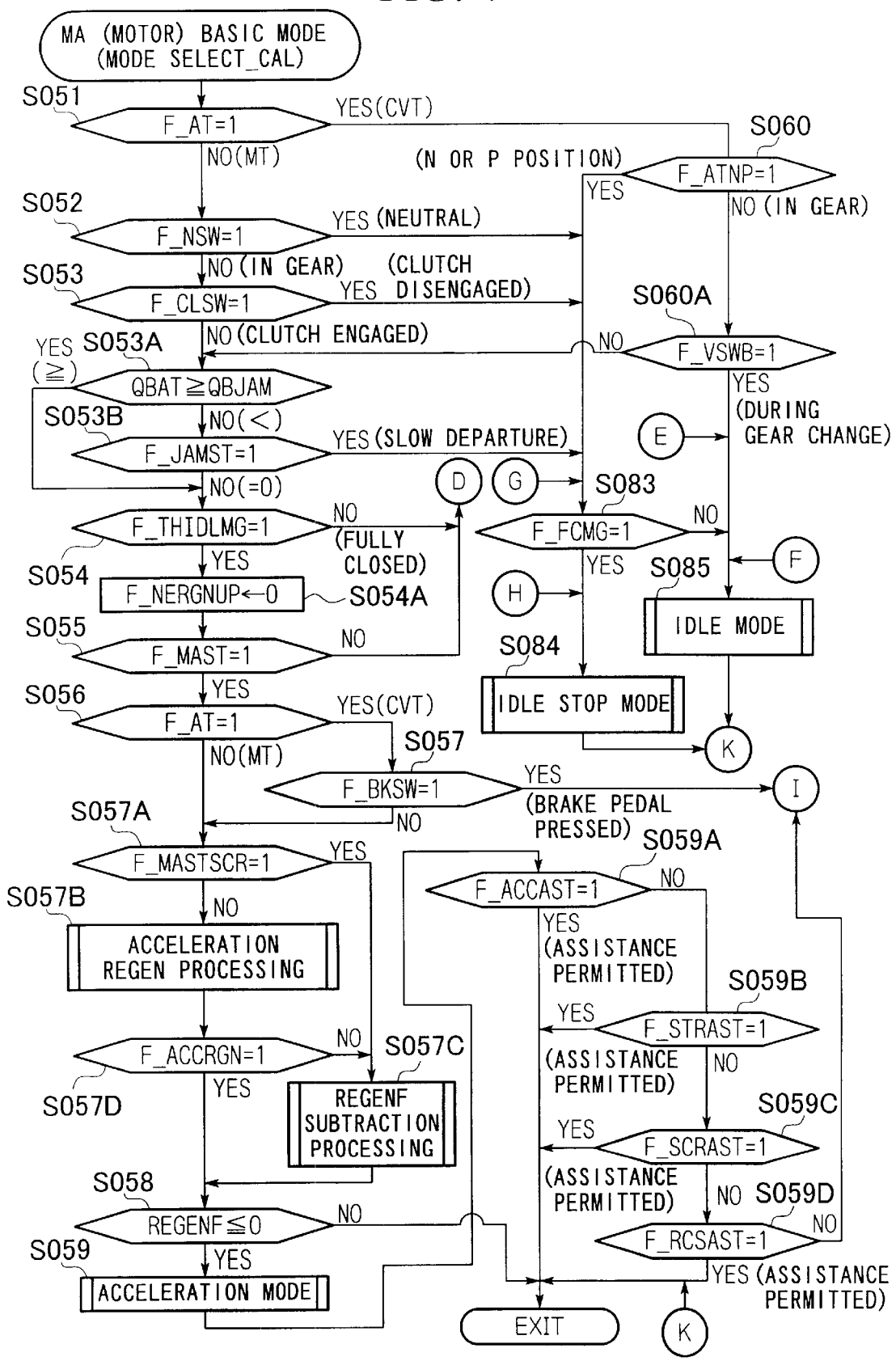
FIG. 4 is a flow chart showing an MA (motor) basic mode of the embodiment of the present invention.
Figure 5:
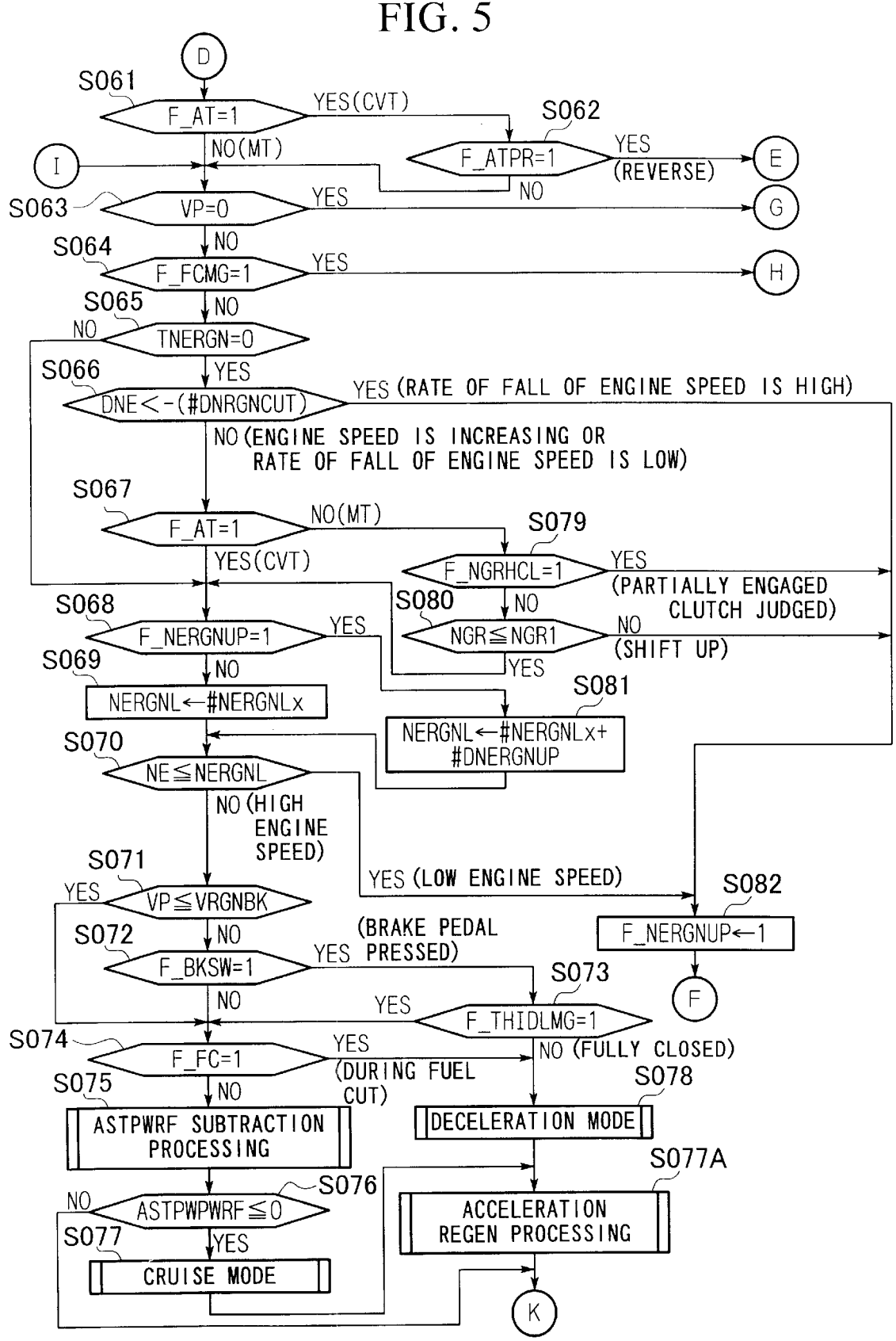
FIG. 5 is a flow chart showing the MA (motor) basic mode of the embodiment of the present invention.

Next is a description of the MA (motor) basic modes which determine in which mode the motor M will operate, based on the flow charts shown in FIG. 4 and FIG. 5.

This processing is repeated at a predetermined cycle time.

Here, the MA (motor) basic modes are: "idle mode", "idle stop mode", "deceleration mode", "cruise mode" and "acceleration mode". In the idle mode, fuel supply is resumed after fuel cut to maintain the engine E in an idle condition, and in the idle stop mode, for example at the time the vehicle is stopped, the engine is stopped in a defined condition. Furthermore, in the deceleration mode, regenerative braking by the motor M is performed. In the acceleration mode, the output of the engine E is assisted by the motor M, and in the cruise mode, the motor M is not driven so that the vehicle runs under the driving force of the engine E. In the abovementioned deceleration mode, all cylinders are cut off.

In step S051 of FIG. 4, it is determined whether an MT (manual transmission)/CVT determination flag F_AT is "1". In the case where the determination result is "yes" (a CVT vehicle), control proceeds to step S060. In the case where the determination result is "no" (an MT vehicle), control proceeds to step S052.

In step S060, for CVT it is determined whether an in gear determination flag F_ATNP is "1". In the case where the determination result is "yes" (N or P position), control proceeds to step S083, and in the case where the determination result is "no" (in gear), control proceeds to step S060A.

In step S060A, it is determined whether the gear shift is being operated (shift position cannot be determined due to the gear shift being operated) by whether a gear shifted flag F_VSWB is "1". In the case where the determination result is "yes" (being shifted), control proceeds to step S085, shifts to "idle mode", and terminates. In idle mode, the engine E is maintained in an idle state. In the case where the determination result of step S060A is "no" (not being shifted), control proceeds to step S053A.

In step S083, it is determined whether an engine stop control execution flag F_FCMG is "1". In the case where the determination result of step S083 is "no", control shifts to "idle mode" in step S085, and terminates. In the case where the determination result of step S083 is "yes", control proceeds to step S084, shifts to "idle stop mode", and terminates. In the idle stop mode, for example at the time the vehicle is stopped, the engine is stopped in a defined condition.

In step S052, it is determined whether a neutral position determination flag F_NSW is "1". In the case where the determination result is "yes" (neutral position), control proceeds to step S083, and in the case where the determination result is "no" (in gear), control proceeds to step S053.

In step S053, it is determined whether a clutch engaged determination flag F_CLSW is "1". In the case where the determination result is "yes" (clutch is disengaged), control proceeds to step S083, and in the case where the determination result is "no" (clutch is engaged), control proceeds to step S053A.

In step S053A, it is determined whether the remaining battery charge QBAT is greater than or equal to the low speed departure determination remaining battery charge QBJAM. In the case where the determination result is "yes", control proceeds to step S054, and in the case where the determination result is "no", control proceeds to step S053B.

In step S053B, it is determined whether a low speed departure determination flag F_JAMST is "1". This low speed departure determination flag F_JAMST is a flag whose setting becomes "1" when a vehicle departs at a low speed and runs slowly. In the case where the determination result of step S053B is "yes", control proceeds to step S083. In the case where the determination result of step S053B is "no", control proceeds to step S054. This is because, in the case where a vehicle has a low battery remaining charge and departs slowly, which means a driver does not intend to accelerate, idle mode or idle stop mode (generating electricity in idle, or stopping the engine by the abovementioned engine stop determination) is preferable in order to protect the battery.

In step S054, it is determined whether an idle determination flag F_THIDLMG is "1". In the case where the determination result is "no" (throttle fully closed), control proceeds to step S061, and in the case where the determination result is "yes" (throttle not fully closed), control proceeds to step S054A.

In step S054A, an engine speed increase flag F_NERGNUP for at the time of partially engaged clutch determination is set to "0", and control proceeds to step S055. Here, this engine speed increase flag F_NERGNUP for at the time of partially engaged clutch determination is described later.

In step S055, it is determined whether a motor assistance determination flag F_MAST is "1". This flag is used to judge whether the engine E is to be assisted by the motor M. In the case of "1", it means that assistance is required, and in the case of "0", assistance is not required. Here, this motor assistance determination flag is set by assistance trigger determination processing.

In the case where the determination result of step S055 is "no", control proceeds to step S061. In the case where the determination result of step S055 is "yes", control proceeds to step S056.

In step S061, it is determined whether the MT/CVT determination flag F_AT is "1". In the case where the determination result is "no" (an MT vehicle), control proceeds to step S063, and in the case where the determination result is "yes" (a CVT vehicle), control proceeds to step S062.

In step S062, it is determined whether a reverse position determination flag F_ATPR is "1". In the case where the determination result is "yes" (reverse position), control proceeds to step S085, and in the case where the determination result is "no" (position other than reverse), control proceeds to step S063.

In step S056, it is determined whether the MT/CVT determination flag F_AT is "1". In the case where the determination result is "yes" (a CVT vehicle), control proceeds to step S057, and in the case where the determination result is "no" (an MT vehicle), control proceeds to step S057A.

In step S057, it is determined whether a brake on determination flag F_BKSW is "1". In the case where the determination result is "yes" (brake on), control proceeds to S063, and in the case where the determination result is "no" (brake off), control proceeds to step S057A.

In step S063, it is determined whether a vehicle speed VP is "0". In the case where the determination result is "yes", control proceeds to step S083, and in the case where the determination result is "no", control proceeds to step S064.

In step S064, it is determined whether the engine stop control execution flag F_FCMG is "1". In the case where the determination result is "no", control proceeds to step S065, and in the case where the determination result is "yes", control proceeds to step S084.

In step S065, it is determined whether a forced gear change REGEN cancellation determination processing delay timer TNERGN is "0". In the case where the determination result is "yes", control proceeds to step S066, and in the case where the determination result is "no", control proceeds to step S068.

In step S066, it is determined whether the rate of change of engine speed DNE is less than the negative value of a DNE REGEN cut determination engine speed #DNRGN-CUT. Here, the DNE REGEN cut determination engine speed #DNRGNCUT is the rate of change DNE of engine speed NE which becomes a reference for judging whether the generation amount is to be reduced, depending on the rate of change of engine speed DNE.

In the case where the determination result of step S066 is that the decrease (rate of fall) of the engine speed NE is high (yes), control proceeds to step S082. In step S082, the engine speed increase flag F_NERGNUP for at the time of partially engaged clutch determination is set to "1", and control proceeds to step S085.

As follows is the reason for providing this engine speed increase flag F_NERGNUP for at the time of partially engaged clutch determination. When the clutch is partially engaged, the engine speed at the time of partially engaged clutch determination is increased in order to prevent hunting, in which the determination result in step S070 to be mentioned later changes frequently each time the engine speed NE changes with the clutch partially engaged. The engine speed increase flag F_NERGNUP for at the time of partially engaged clutch determination is set in order to indicate this.

In the case where the determination result of step S066 is that the engine speed NE is increasing, or the decrease (rate of fall) of the engine speed NE is low (no), control proceeds to step S067.

In step S067, it is determined whether the MT/CVT flag F_AT is "1". In the case where the determination result is "no" (an MT vehicle), control proceeds to step S079, and in the case where the determination result is "yes" (a CVT vehicle), control proceeds to step S068.

In step S079, it is determined whether a partially engaged clutch determination flag F_NGRHCL is "1". In the case where the determination result is that the clutch is determined to be partially engaged (yes), control proceeds to step S082. Furthermore, in the case where the clutch is not determined to be partially engaged (no), control proceeds to step S080.

In step S080, the previous gear position NGR and the present gear position NGR1 are compared, and it is determined whether there has been a shift up by comparison between the present and previous gear positions.

In the case where the determination result of step S080 is that the gear position has been shifted up (no), control proceeds to step S082. In the case where the determination result of step S080 is that the gear position has not been shifted up between the previous and present times (yes), control proceeds to step S068. The reason that control shifts to step S082, and afterwards shifts to idle mode, in this manner when the clutch is partially engaged, is that if regeneration is performed in a partially engaged clutch state, there is a possibility of stalling the engine. Furthermore, the reason that control proceeds to step S082, and afterwards shifts to idle mode, in the case of shifting up, is that if regeneration is performed at the time of low engine speed due to shifting up, there is a possibility of stalling the engine.

In step S068, it is determined whether the engine speed increase flag F_NERGNUP for at the time that the partially engaged clutch determination is "1". In the case where the determination result is that an increase in engine speed is required at the time of partially engaged clutch determination and the flag is set (=1, yes), control proceeds to step S081. In step S081, an engine speed increase #DNERGNUP for preventing hunting is added to the charge engine speed lower limit value #NERGNLx, which is set for each gear, the value obtained by this addition is set to the charge engine speed lower limit value NERGNL, and control proceeds to step S070. In the case where the determination result of step S068 is that an increase in engine speed is not required at the time of partially engaged clutch determination, and the flag is reset (=0, no), control proceeds to step S069, the charge engine speed lower limit value #NERGNLx, which is set for each gear, is set to the charge engine speed lower limit value NERGNL, and control proceeds to step S070.

Then, in step S070 it is determined whether the engine speed NE is less than or equal to the charge engine speed lower limit value NERGNL. In the case where the determination result is that the engine speed NE is low (NE≦NERGNL, yes), control proceeds to step S082. In the case where the determination result is that the engine speed NE is high (NE>NERGNL, no), control proceeds to step S071.

In step S057A, it is determined whether a scramble assistance request flag F_MASTSCR is "1". This scramble assistance is for improving the perceived feeling of acceleration by increasing the assistance amount temporarily at the time of acceleration. Basically, when the rate of throttle change is high, the arrangement is such that the scramble assistance request flag F_MASTSCR is set to "1".

In the case where the determination result of step S057A is "no", acceleration REGEN processing is performed in step S057B, and control proceeds to step S057D. Furthermore, in the case where the determination result of step S057A is "yes", subtraction processing for a final charge instruction value REGENF is performed in step S057C, and control proceeds to step S058.

In step S057D, it is determined whether an acceleration REGEN processing flag F_ACCRGN is "1". In the case where the determination result is "yes" (processing has been performed), control proceeds to step S058, and in the case where the determination result is "no" (processing has not been performed), control proceeds to step S057C.

In step S058, it is determined whether the final charge instruction value REGENF is less than or equal to "0". In the case where the determination result is "yes", control proceeds to "acceleration mode" in step S059. In acceleration mode, the output of the engine E is assisted by the motor M, and control proceeds to step S059A. In the case where the determination result of step S058 is "no", control terminates.

In step S059A, it is determined whether an assistance permit flag F_ACCAST is "1". In the case where the determination result is "yes", control terminates, and in the case where the determination result is "no", control proceeds to step S059B.

In step S059B, it is determined whether a departure assistance permit flag F_STRAST is "1". In the case where the determination result is "yes", control terminates, and in the case where the determination result is "no", control proceeds to step S059C.

In step S059C, it is determined whether a scramble assistance permit flag F_SCRAST is "1". In the case where the determination result is "yes", control terminates, and in the case where the determination result is "no", control proceeds to step S059D.

In step S059D, it is determined whether a cylinder cut-off resumption assistance permit flag F_RCSAST is "1". In the case where the determination result is "yes", control terminates, and in the case where the determination result is "no", control proceeds to step S063. Here, the case where the cylinder cut-off resumption assistance permit flag F_RCSAST is "1", means that assistance by the motor is permitted when shifting from all cylinder cut-off operation to be described later to all cylinder (normal) operation.

In step S071, it is determined whether the vehicle speed VP is less than or equal to the deceleration mode brake determination lower vehicle speed limit #VRGNBK. Here, this deceleration mode brake determination lower vehicle speed limit #VRGNBK is a value with hysteresis. In the case where the determination result is that the vehicle speed VP≦ the deceleration mode brake determination lower vehicle speed limit #VRGNBK (yes), control proceeds to step S074. In the case where the determination result in step S071 is that the vehicle speed VP>the deceleration mode brake determination lower vehicle speed limit #VRGNBK (no), control proceeds to step S072.

In step S072, it is determined whether a brake on determination flag F_BKSW is "1". In the case where the determination result is "yes", control proceeds to step S073, and in the case where the determination result is "no", control proceeds to step S074.

In step S073, it is determined whether an idle determination flag F_THIDLMG is "1". In the case where the determination result is "no" (throttle is fully closed), control proceeds to "deceleration mode" in step S078, acceleration REGEN processing is performed in step S077A, and control terminates. Here, in deceleration mode, regenerative braking is performed by the motor M. However, in deceleration mode all cylinders are cut off, so that the amount of regeneration by the motor M can be increased by the amount that engine friction is reduced. In the case where the determination result of step S073 is "yes" (throttle is not fully closed), control proceeds to step S074.

In step S074, it is determined whether a fuel cut flag F_FC is "1". This flag is a fuel cut determination flag, which becomes "1" when regeneration by the motor M is performed in "deceleration mode" in step S078, and cuts the fuel off. If the result of the determination in step S074 is that deceleration fuel cut is in effect (yes), control proceeds to step S078. If the result of the determination in step S074 is that fuel cut is not in effect (no), control proceeds to step S075, where the final assistance instruction value ASTPWRF subtraction processing is performed, and then proceeds to step S076.

In step S076, it is determined whether the final assistance instruction value ASTPWRF is less than or equal to "0". In the case where the determination result is "yes", control shifts to "cruise mode" in step S077, acceleration REGEN processing is performed in step S077A, and control terminates. In cruise mode the motor M does not drive the vehicle and the vehicle runs under the driving force of the engine E. Furthermore, the battery 3 may be charged by regenerative operation of the motor M or by using the motor as a generator depending on the running conditions of the vehicle.

In the case where the determination result of step S076 is "no", control terminates.

[All Cylinder Cut-Off Operation Switching Execution Processing]

Figure 6:
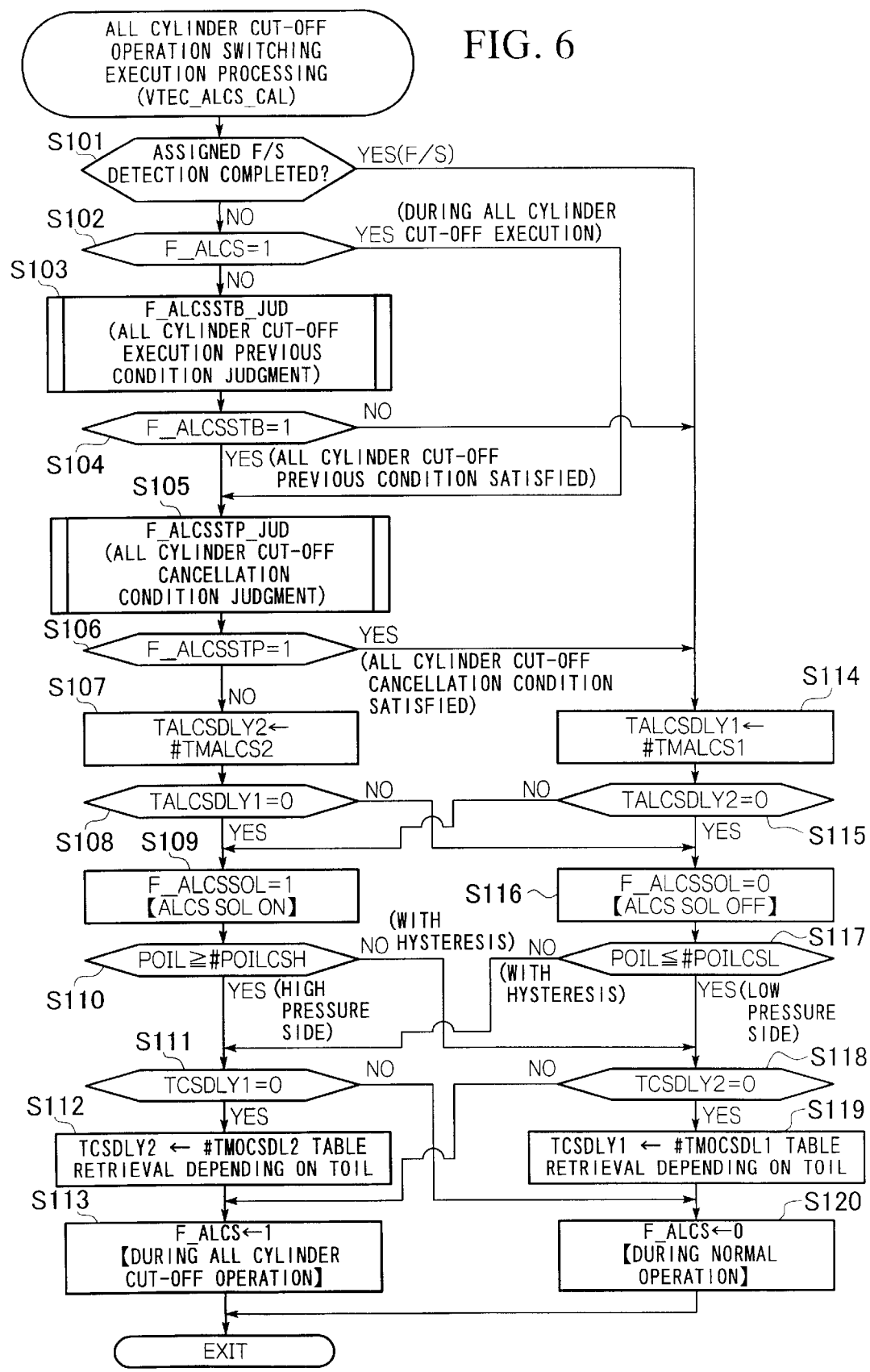
FIG. 6 is a flow chart showing all cylinder cut-off operation switching execution processing of the embodiment of the present invention.

Next is a description of all cylinder cut-off operation switching execution processing based on FIG. 6.

Here, all cylinder cut-off operation means an operation that closes the intake valves and exhaust valves by the aforementioned variable valve timing system VT at the time of deceleration regeneration under certain conditions, and is performed in order to reduce engine friction and to increase the amount of deceleration regeneration. In the following flow chart, a flag (all cylinder cut-off execution flag F_ALCS) is set and reset to switch between an all cylinder cut-off operation and a normal operation that does not cut off the cylinders, in a predetermined cycle time. Cylinder cut-off of the engine E is performed by means of the all cylinder cut-off execution flag F_ALCS, and based on a later described all cylinder cut-off standby flag F_ALCSSTB, an all cylinder cut-off cancellation condition satisfied flag F_ALCSSTP, an all cylinder cut-off solenoid flag F_ALCSSOL, step S110, step S117, step S112 and step S119. The processing related to the all cylinder cut-off execution flag F_ALCS constitutes a cylinder cut-off control section.

In step S101, it is determined whether assigned F/S (fail safe) detection is completed. In the case where the determination result is "no", control proceeds to step S102, and in the case where the determination result is "yes", control proceeds to step S114. This is because if there is any abnormality, all cylinders should not be cut off.

In step S102, it is determined whether the all cylinder cut-off operation is active by whether the all cylinder cut-off execution flag F_ALCS is "1". The all cylinder cut-off execution flag F_ALCS is a flag set by the processing shown in this flow chart of FIG. 6. In the case where the flag is set to "1", the all cylinder cut-off operation is performed, and in the case of "0", all cylinder cut-off is not performed, but normal operation is performed.

In the case where the determination result of step S102 is "yes", and all cylinder cut-off is in effect, control proceeds to step S105. Accordingly, if all cylinder cut-off is determined to be in effect (F_ALCS=1) by an all cylinder cut-off execution previous condition determination to be mentioned later, all cylinder cut-off previous condition determination is not performed. In the case where the determination result of step S102 is "no", and all cylinder cut-off is not in effect, in step S103 an all cylinder cut-off execution previous condition determination (F_ALCSSTB_JUD) is performed, and control proceeds to step S104. All cylinders are cut off only in the case where the previous condition is satisfied by the all cylinder cut-off execution previous condition determination.

In step S104, it is determined whether an all cylinder cut-off standby flag F_ALCSSTB (cylinder cut-off determination section) is "1". This flag is set to "1" when the previous condition is satisfied by the determination in step S103, and is set to "0" when it is not satisfied. By means of this flag, it is determined whether the cylinders should be cut off depending on the running conditions of the vehicle. In the case where the determination result of step S104 is "yes", since the previous condition is satisfied, control proceeds to step S105. In the case where the determination result of step S104 is "no", since the previous condition is not satisfied, control proceeds to step S114.

In step S105, an all cylinder cut-off cancellation condition determination (F_ALCSSTP_JUD), to be described later, is performed, and control proceeds to step S106. In the case where the cancellation condition is satisfied by this all cylinder cut-off cancellation condition determination, all cylinder cut-off operation is not executed. The all cylinder cut-off cancellation condition determination is always performed when the processing of FIG. 6 is performed, which is different from the all cylinder cut-off previous condition determination.

In step S106, it is determined whether an all cylinder cut-off cancellation condition satisfied flag F_ALCSSTP (cylinder cut-off cancellation determination section) is "1". This flag is set to "1" when the cancellation condition is satisfied by the determination in step S105, and is set to "0" when not satisfied. By means of this flag, it is determined whether the cylinder cut-off should be cancelled, depending on the running conditions of the vehicle while the operation of the cylinders of the engine is cut off. In the case where the determination result of step S106 is "yes", since the cancellation condition is satisfied, control proceeds to step S114. In the case where the determination result of step S106 is "no", since the cancellation condition is not satisfied, control proceeds to step S107.

In step S107, a solenoid off delay timer TALCSDLY2 for the aforementioned spool valve SV is set to a predetermined value #TMALCS2, and control proceeds to step S108. This is to ensure a certain time period from when the determination in step S105 is completed until the solenoid of the spool valve SV finishes being turned off in step S116 to be mentioned later, when all cylinder cut-off operation is shifted to normal operation.

In step S108, it is determined whether a solenoid on delay timer TALCSDLY1 to be described later is "0". In the case where the determination result is "yes", since a certain time has passed, control proceeds to step S109. In the case where the determination result of step S108 is "no", since a certain time has not passed, control proceeds to step S116.

In step S109, an all cylinder cut-off solenoid flag F_ALCSSOL is set to "1" (all cylinder cut-off solenoid of the spool valve SV is turned on), and control proceeds to step S110. The processing associated with this all cylinder cut-off solenoid flag F_ALCSSOL constitutes one cylinder cut-off execution section which operates the spool valve SV to cut off the cylinder operation of the engine.

In step S110, it is determined by an oil pressure sensor whether oil pressure is actually generated by the solenoid being turned on for all cylinder cut-off. To be specific, it is determined whether the engine oil pressure POIL is greater than or equal to an all cylinder cut-off operation execution determination oil pressure #POILCSH (for example, it is determined whether it is greater than or equal to 137 kPa (=1.4 kg/cm$^2$)). In the case where the determination result is "yes", which means on the high pressure side, control proceeds to step S111. In the case where the determination result is "no" (there is hysteresis), control proceeds to step S118. Here, it is also possible to judge using an oil switch instead of an oil pressure sensor.

In step S111, it is determined whether an all cylinder cut-off operation execution delay timer TCSDLY1 is "0" in order to ensure a certain time period from when the spool valve SV is turned on until the oil pressure is applied. In the case where the determination result is "yes", control proceeds to step S112. In the case where the determination result is "no", control proceeds to step S120.

In step S112, an all cylinder cut-off operation cancellation delay timer TCSDLY2 is set to a timer value #TMOCSDL2 retrieved from a look up table depending on oil temperature TOIL measured by an oil temperature sensor. This is because oil temperature has an influence on operating delays. For instance if the oil temperature is low, it takes longer for the oil pressure to rise. Therefore this timer value #TMOCSDL2 increases as the oil temperature TOIL decreases.

Then, in step S113 the all cylinder cut-off execution flag F_ALCS is set to "1", and control terminates. Here, in step S112 the aforementioned timer value may be retrieved based on engine water temperature instead of oil temperature.

In step S114, the solenoid on delay timer TALCSDLY1 of the spool valve SV is set to a predetermined value #TMALCS1, and control proceeds to step S115. This is to ensure a certain time period between when the determination in step S105 is completed and the solenoid of the spool valve SV is turned on in step S109, when normal operation shifts to all cylinder cut-off operation.

In step S115, it is determined whether the solenoid off delay timer TALCSDLY2 is "0". In the case where the determination result is "yes", since a certain time has passed, control proceeds to step S116. In the case where the determination result of step S115 is "no", since a certain time has not passed, control proceeds to step S109.

In step S116, the all cylinder cut-off solenoid flag F_ALCSSOL is set to "0" (all cylinder cut-off solenoid of the spool valve SV is turned off), and control proceeds to step S117.

In step S117, it is determined by the oil pressure sensor whether oil pressure is actually cancelled by turning off the solenoid for all cylinder cut-off cancellation. To be specific, it is determined whether the engine oil pressure POIL is less than or equal to the all cylinder cut-off operation cancellation determination oil pressure #POILCSL (for example, 98 kPa (=1.0 kg/cm$^2$)). In the case where the determination result is "yes", which means on the low pressure side, control proceeds to step S118. In the case where the determination result is "no" (there is hysteresis), control proceeds to step S111. In this case, it is also possible to use an oil switch instead of an oil pressure sensor.

In step S118, it is determined whether the all cylinder cut-off operation execution delay timer TCSDLY2 is "0" in order to ensure a certain time period from when the spool valve SV is turned off until the oil pressure is cancelled. In the case where the determination result is "yes", control proceeds to step S119. In the case where the determination result is "no", control proceeds to step S113.

In step S119, the all cylinder cut-off operation execution delay timer TCSDLY1 is set to a timer value #TMOCSDL1 retrieved from a look up table depending on the oil temperature TOIL measured by an oil temperature sensor. This is because oil temperature has an influence on operating delays. For instance if the oil temperature is low, it takes longer for the oil pressure to rise. Therefore this timer value #TMOCSDL1 increases as the oil temperature decreases.

Then, in step S120, the all cylinder cut-off execution flag F_ALCS is set to "0", and control terminates. Here, in step S119 the aforementioned timer value may be retrieved based on engine water temperature instead of oil temperature.

[All Cylinder Cut-Off Previous Condition Execution Determination Processing]

Figure 7:
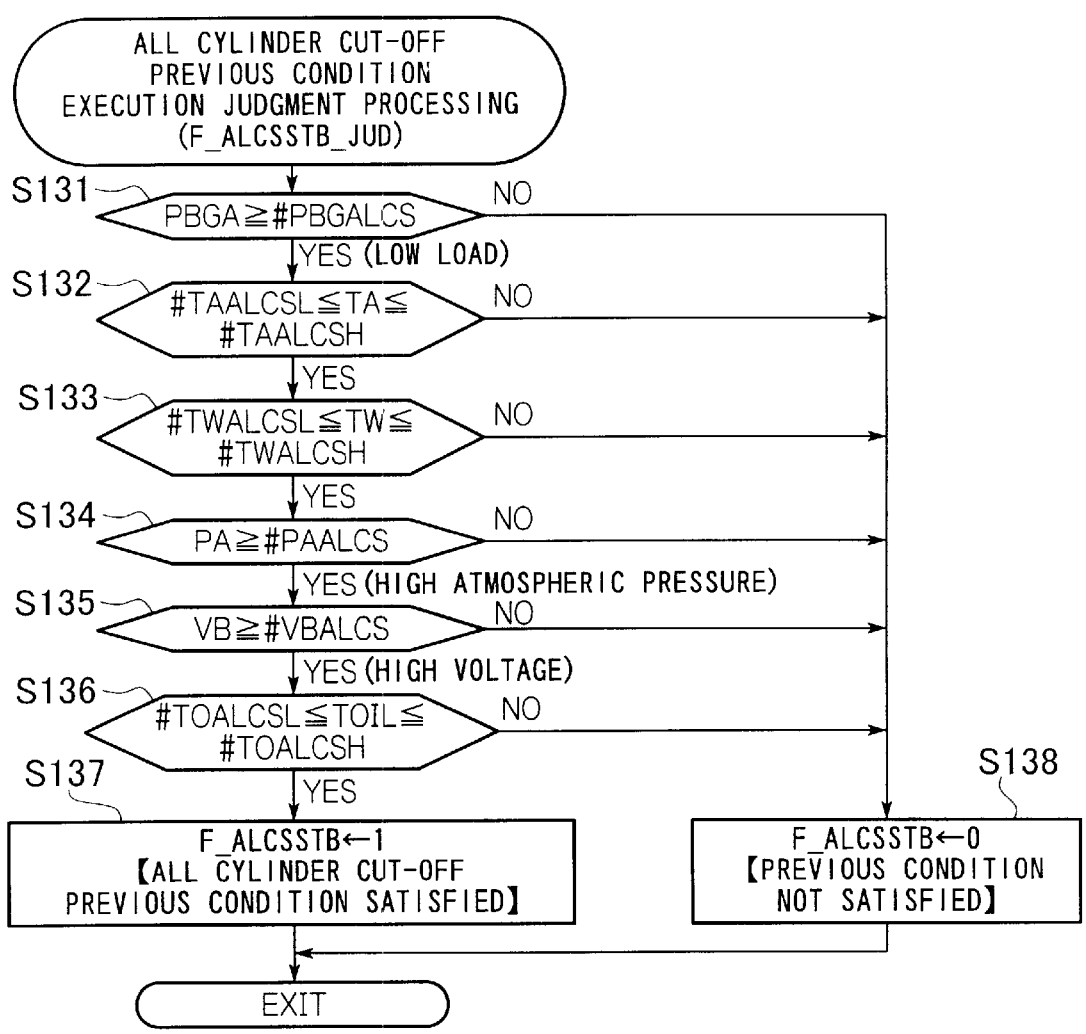
FIG. 7 is a flow chart showing all cylinder cut-off previous condition execution determination processing of the embodiment of the present invention.

Next is a description of all cylinder cut-off previous condition execution determination processing in step S103 of FIG. 6, based on FIG. 7. This processing is repeated at a predetermined cycle time.

In step S131, it is determined whether the inlet pipe negative pressure PBGA is greater than or equal (i.e., on the atmospheric pressure side) to an all cylinder cut-off execution upper negative pressure limit #PBGALCS (for example, −40 kPa (=−300 mmHg)). This is because if the engine load is high, it is not desirable to perform all cylinder cut-off. In the case where the determination result of step S131 is "yes" (low load), control proceeds to step S132, and in the case where the determination result is "no", control proceeds to step S138.

In step S138, since the all cylinder cut-off previous condition is not satisfied, the all cylinder cut-off standby flag F_ALCSSTB is set to "0", and control terminates.

In step S132, it is determined whether an outside air temperature TA is within a predetermined range, more specifically whether all cylinder cut-off execution lower air temperature limit #TAALCSL (for example 0° C.)≦TA≦all cylinder cut-off execution upper air temperature limit #TAALCSH (for example 50° C.) is satisfied. In the case where the determination result of step S132 is that the outside air temperature TA is within the predetermined range, control proceeds to step S133. In the case where the determination result is that the outside air temperature is outside of the predetermined range, control proceeds to step S138. This is because if all cylinder cut-off is performed in a case where the outside air temperature TA is lower than the all cylinder cut-off execution lower air temperature limit #TAALCSL, or higher than the all cylinder cut-off execution upper air temperature limit #TAALCSH, the engine becomes unstable.

In step S133, it is determined whether a cooling water temperature TW is within a predetermined range, more specifically whether all cylinder cut-off execution lower cooling water temperature limit #TWALCSL (for example 70° C.)≦TW≦all cylinder cut-off execution upper cooling water temperature limit #TWALCSH (for example 100° C.) is satisfied. In the case where the determination result of step S133 is that the cooling water temperature TW is within the predetermined range, control proceeds to step S134. In the case where it is outside of the predetermined range, control proceeds to step S138. This is because if all cylinder cut-off is performed in a case where the cooling water temperature TW is lower than the all cylinder cut-off execution lower cooling water temperature limit #TWALCSL, or higher than the all cylinder cut-off execution upper cooling water temperature limit #TWALCSH, the engine becomes unstable.

In step S134, it is determined whether atmospheric pressure PA is greater than or equal to an all cylinder cut-off execution upper atmospheric pressure limit #PAALCS (for example 77.3 kPa (=580 mmHg)). In the case where the determination result of step S134 is "yes" (high atmospheric pressure), control proceeds to step S135, and in the case where the determination result is "no", control proceeds to step S138. This is because when atmospheric pressure is low, it is not desirable to perform all cylinder cut-off. (For example, because there is a possibility of not ensuring a sufficient level of the brake master power negative pressure at the time of brake operation.)

In step S135, it is determined whether the voltage VB (drive source voltage) of the 12 volt auxiliary battery 4 is greater than or equal to an all cylinder cut-off execution upper voltage limit #VBALCS (for example 10.5V). In the case where the determination result is "yes" (high voltage), control proceeds to step S136, and in the case where the determination result is "no", control proceeds to step S138. This is because if the voltage VB of the 12 volt auxiliary battery 4 is less than a predetermined value, the responsiveness of the spool valve SV deteriorates. This is to counter the possibility of the battery voltage falling in a low temperature environment, or the battery deteriorating.

In step S136, it is determined whether the oil temperature TOIL is within a predetermined range, more specifically whether all cylinder cut-off execution lower oil temperature limit #TOALCSL (for example 70° C.)≦TOIL≦all cylinder cut-off execution upper oil temperature limit #TOALCSH (for example 100° C.) is satisfied. In the case where the determination result of step S136 is that the oil temperature TOIL is within the predetermined range, control proceeds to step S137. In the case where it is outside of the predetermined range, control proceeds to step S138. This is because if all cylinder cut-off is performed when the oil temperature TOIL is lower than the all cylinder cut-off execution lower oil temperature limit #TOALCSL, or higher than the all cylinder cut-off execution upper oil temperature limit #TOALCSH, the switching response between the engine operating and all cylinders being cut off would be unstable.

In step S137, since the all cylinder cut-off previous condition is satisfied, the all cylinder cut-off standby flag F_ALCSSTB is set to "1", and control terminates.

[All Cylinder Cut-Off Cancellation Condition Determination Processing]

Figure 8:
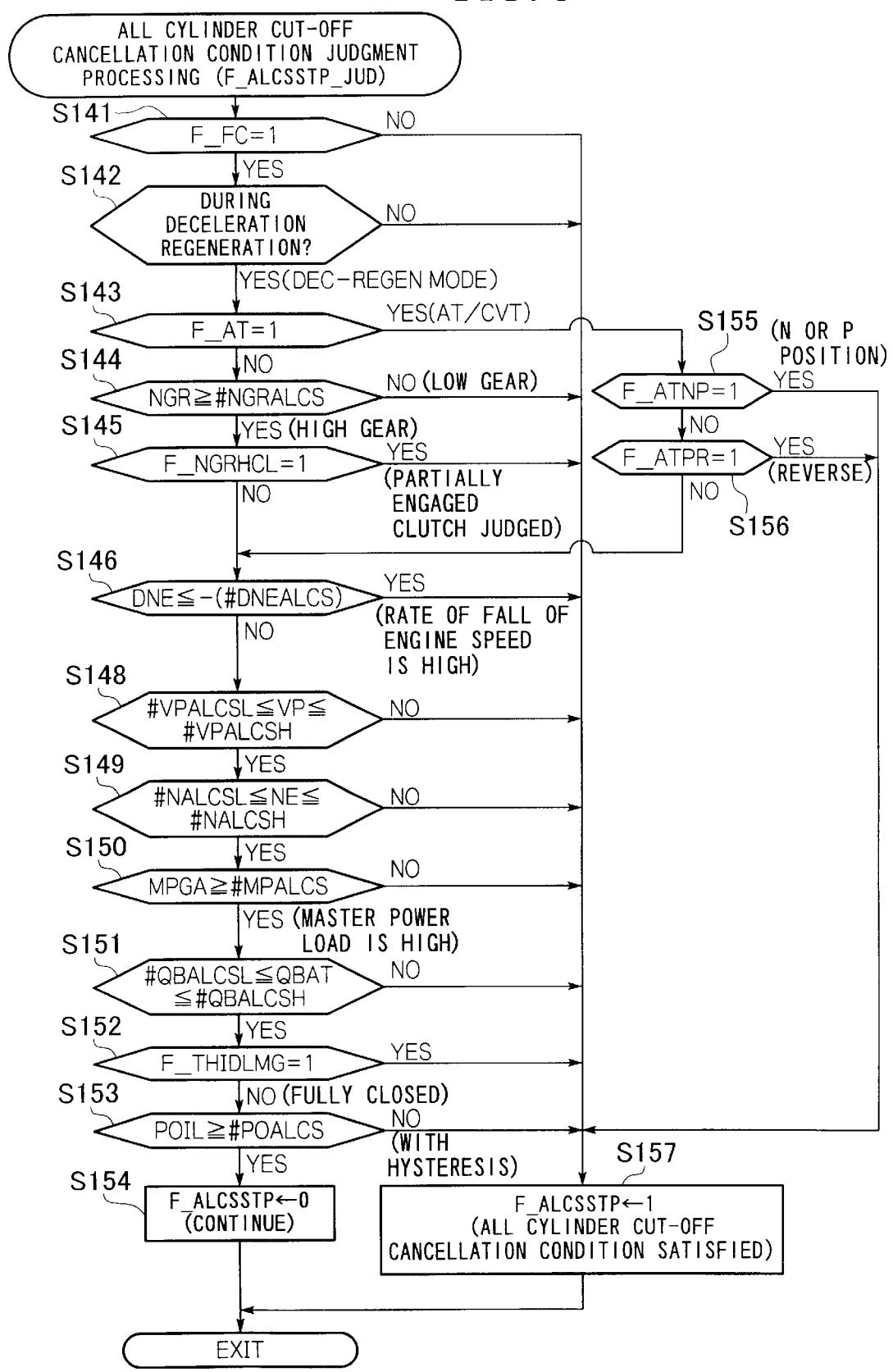
FIG. 8 is a flow chart showing all cylinder cut-off cancellation condition determination processing of the embodiment of the present invention.

Next is a description of all cylinder cut-off cancellation condition determination processing in step S105 of FIG. 6, based on FIG. 8. This processing is repeated at a predetermined cycle time.

In step S141, it is determined whether the fuel cut flag F_FC is "1". In the case where the determination result of step S141 is "yes", control proceeds to step S142, and in the case where the determination result is "no", control proceeds to step S157. This determination is because all cylinder cut-off is aimed at reducing engine friction at the time of deceleration fuel cut, and increasing the amount of regeneration by the reduced amount of the engine friction.

In step S157, since the all cylinder cut-off cancellation condition is satisfied, the all cylinder cut-off cancellation condition satisfied flag F_ALCSSTP is set to "1", and control terminates.

In step S142, it is determined whether deceleration regeneration is in effect. In the case where the determination result of step S142 is "yes", control proceeds to step S143, and in the case where the determination result is "no", control proceeds to step S157.

In step S143, it is determined whether the MT/CVT determination flag F_AT is "1". In the case where the determination result is "no" (an MT vehicle), control proceeds to step S144. In the case where the determination result is "yes" (an AT/CVT vehicle), control proceeds to step S155.

In step S155, it is determined whether the in gear determination flag F_ATNP is "1". In the case where the determination result is "no" (in gear), control proceeds to step S156. In the case where the determination result is "yes" (N or P position), control proceeds to step S157.

In step S156, it is determined whether the reverse position determination flag F_ATPR is "1". In the case where the determination result is "yes" (reverse position), control proceeds to step S157. In the case where the determination result is "no" (position other than reverse), control proceeds to step S146.

All cylinder cut-off in the N or P position and reverse position is cancelled by the processing of step S155 and step S156.

In step S144, it is determined whether the previous gear position NGR is higher than the all cylinder cut-off continuation lower gear position limit #NGRALCS (including this position, for example third gear). In the case where the determination result is "yes" (higher gear), control proceeds to step S145, and in the case where the determination result is "no" (lower gear), control proceeds to step S157. This is to avoid the situation where in low gear, cylinder cut-off operation is repeated frequently due to a reduction in the regeneration rate, or traffic congestion and the like.

In step S145, it is determined whether the partially engaged clutch determination flag F_NGRHCL is "1" (partially engaged clutch). In the case where the determination result is "yes" (partially engaged clutch), control proceeds to step S157, and in the case where the determination result is "no", control proceeds to step S146. Accordingly, it is possible to prevent unnecessarily cut-off of the cylinders which causes errors such as stalling the engine by stopping the vehicle on a partially engaged clutch, or a situation in which an acceleration request by a driver cannot be satisfied because of the gear shift while accelerating on a partially engaged clutch In step S146, it is determined whether the rate of change DNE of the engine speed is less than or equal to the negative value of an all cylinder cut-off continuation execution upper engine speed change rate limit #DNEALCS (for example −100 rpm). In the case where the determination result is "yes" (rate of decrease of engine speed is high), control proceeds to step S157, and in the case where the determination result is "no", control proceeds to step S148. This is to prevent the engine from stalling when all cylinder cut-off is performed when the rate of decrease of the engine speed is high.

In step S148, it is determined whether the vehicle speed VP is within a predetermined range, more specifically whether all cylinder cut-off continuation execution lower vehicle speed limit #VPALCSL (for example 10 km/h) ≦VP≦all cylinder cut-off continuation execution upper vehicle speed limit #VPALCSH (for example 60 km/h) is satisfied. As a result of the determination in step S148, if it is determined that the vehicle speed VP is within the predetermined range, control proceeds to step S149. If the vehicle speed VP is outside of the predetermined range, control proceeds to step S157. In a case where the vehicle speed VP is lower than the all cylinder cut-off continuation execution lower vehicle speed limit #VPALCSL, or higher than the all cylinder cut-off continuation execution upper vehicle speed limit #VPALCSH, all cylinder cut-off is cancelled.

In step S149, it is determined whether the engine speed is within a predetermined range, more specifically whether all cylinder cut-off continuation execution lower engine speed limit #NALCSL (for example 800 rpm)≦NE≦all cylinder cut-off continuation execution upper engine speed limit #NALCSH (for example 3000 rpm) is satisfied. As a result of the determination in step S149, if it is determined that the engine speed NE is within the predetermined range, control proceeds to step S150. If the engine speed NE is outside of the predetermined range, control proceeds to step S157. In the case where the engine speed NE is lower than the all cylinder cut-off continuation execution lower engine speed limit #NALCSL, or higher than the all cylinder cut-off continuation execution upper engine speed limit #NALCSH, all cylinder cut-off is cancelled. This is because if the engine speed NE is low, there is a possibility that the regeneration efficiency is low, and that the oil pressure required for all cylinder cut-off switching cannot be ensured. Furthermore, this is because if the engine speed NE is too high, the oil pressure becomes too high due to high engine speed, and there is a possibility that the switch to cylinder cut-off cannot be performed. Moreover, this is because there is a possibility of excessive consumption of working fluid for cylinder cut-off.

In step S150, it is determined whether the brake master power internal negative pressure MPGA is greater than or equal to an all cylinder cut-off continuation execution upper negative pressure limit #MPALCS (for example −26.7 kPa (=−200 mmHg)). As a result of the determination in step S150, if the brake master power internal negative pressure MPGA is greater than or equal (i.e., on the atmospheric pressure side) to the all cylinder cut-off continuation execution upper negative pressure limit #MPALCS (MPGA≧#MPALCS, yes), control proceeds to step S151. As a result of the determination in step S150, if the brake master power internal negative pressure MPGA is lower than the all cylinder cut-off continuation execution upper negative pressure limit #MPALCS (MPGA<#MPALCS, no), control proceeds to step S157. This is because it is not desirable to continue all cylinder cut-off when a sufficient brake master power internal negative pressure MPGA cannot be obtained.

In step S151, it is determined whether the remaining battery charge QBAT is within a predetermined range, more specifically whether all cylinder cut-off continuation execution lower remaining charge limit #QBALCSL (for example 30%)≦QBAT≦all cylinder cut-off continuation execution upper remaining charge limit #QBALCSH (for example 80%) is satisfied. As a result of the determination in step S151, if the remaining battery charge QBAT is determined to be within the predetermined range, control proceeds to step S152. If the remaining battery charge QBAT is outside of the predetermined range, control proceeds to step S157. In the case where the remaining battery charge QBAT is lower than the all cylinder cut-off continuation execution lower remaining charge limit #QBALCSL, or higher than the all cylinder cut-off continuation execution upper remaining charge limit #QBALCSH, all cylinder cut-off is cancelled. This is because if the remaining battery charge QBAT is too low, the energy required for assisting engine drive with the motor M, which is performed when resuming from all cylinder cut-off, cannot be ensured. Furthermore, this is because if remaining battery charge QBAT is too high, regeneration cannot be obtained.

In step S152, it is determined whether the idle determination flag F_THIDLMG is "1". In the case where the determination result is "yes" (throttle not fully closed), control proceeds to step S157, and in the case where the determination result is "no" (throttle fully closed state), control proceeds to step S153. This is so that if the throttle opens even a little from the fully closed throttle state, continuation of all cylinder cut-off is cancelled, thereby enhancing marketability of a vehicle.

In step S153, it is determined whether the engine oil pressure POIL is greater than or equal to an all cylinder cut-off continuation execution lower oil pressure limit #POALCS (for example 98 to 137 kPa (1.0 to 1.4 kg/cm$^2$) with hysteresis). In the case where the determination result is "yes", control proceeds to step S154, and in the case where the determination result is "no", control proceeds to step S157. This is because if the engine oil pressure POIL is lower than the all cylinder cut-off continuation execution lower oil pressure limit #POALCS, it is not possible to obtain a sufficient oil pressure (for example, oil pressure to operate the spool valve SV), to perform cylinder cut-off.

In step S154, since the all cylinder cut-off cancellation condition is not satisfied, the all cylinder cut-off cancellation condition satisfaction flag F_ALCSSTP is set to "0" in order to continue all cylinder cut-off, and control terminates.

[Fuel Cut Execution Determination Processing]

Figure 9:
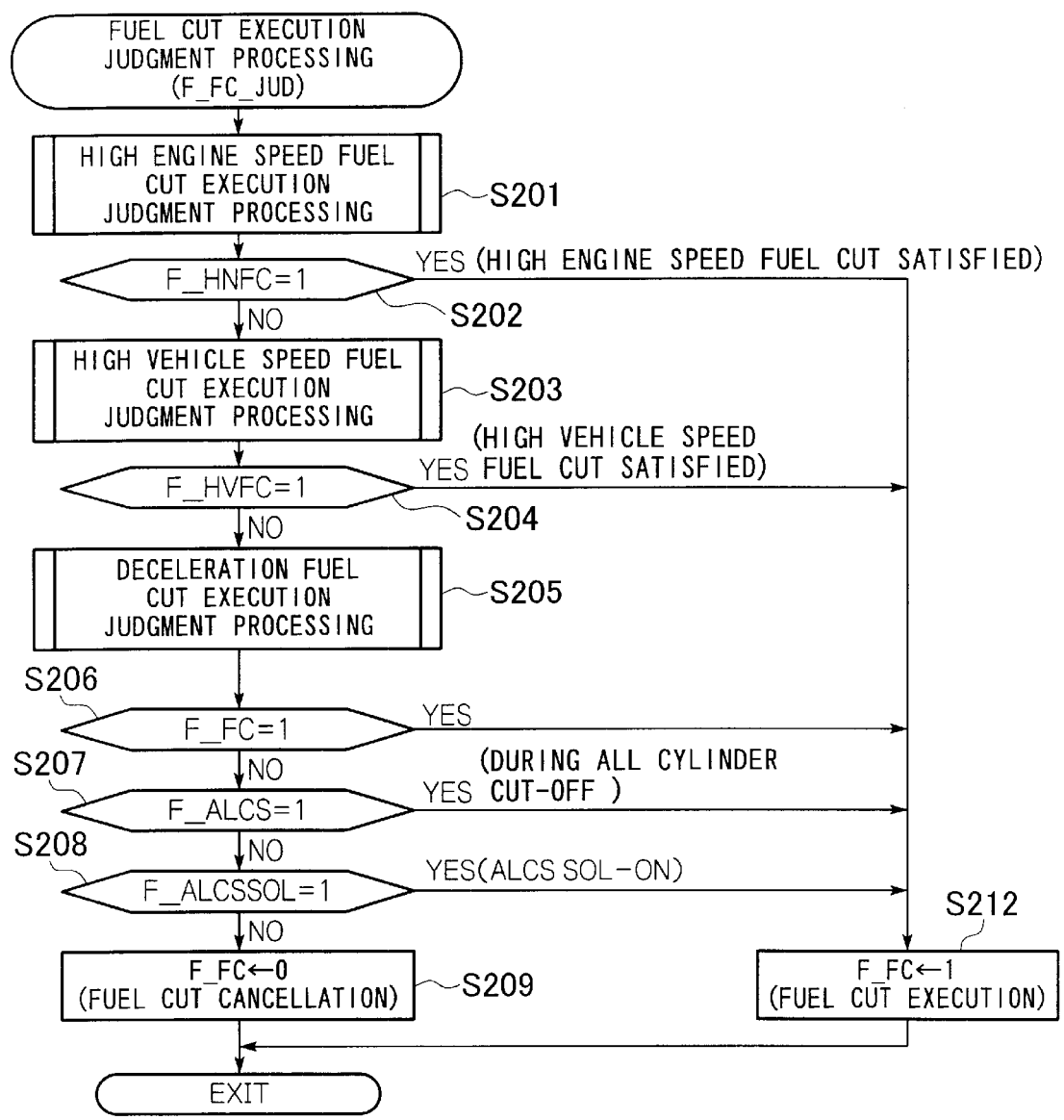
FIG. 9 is a flow chart showing fuel cut execution determination processing of the embodiment of the present invention.

Next is a description of fuel cut execution determination processing based on FIG. 9. This processing is repeated at a predetermined cycle time.

Normally, the fuel is cut when a certain condition is satisfied with an object of protecting the engine and improving the fuel consumption. However, a condition related to all cylinder cut-off is added to the determination processing for determining whether this fuel cut is to be performed.

In step S201, high engine speed fuel cut execution determination processing is performed, and control proceeds to step S202. This fuel cut is performed to protect the engine when the engine speed is high (for example, engine speed NE is greater than or equal to 6200 rpm). The setting and resetting of a high engine speed fuel cut flag F_HNFC are performed by this processing.

In step S202, it is determined whether the high engine speed fuel cut flag F_HNFC is "1". In the case where the determination result is "yes" (high engine speed fuel cut satisfied), control proceeds to step S212, and in the case where the determination result is "no", control proceeds to step S203.

In step S212, a fuel cut flag F_FC is set to "1", and control terminates. Here, in the case where the fuel cut flag F_FC is "1", fuel injection is not performed.

In step S203, high vehicle speed fuel cut execution determination processing is performed, and control proceeds to step S204. This fuel cut is performed from the viewpoint of limiting speed when the vehicle speed is high (for example, greater than or equal to 180 km/h). The setting and resetting of a high vehicle speed fuel cut flag F_HVFC are performed by this processing.

In step S204, it is determined whether the high vehicle speed fuel cut flag F_HVFC is "1". In the case where the determination result is "yes" (high vehicle speed fuel cut satisfied), control proceeds to step S212, and in the case where the determination result is "no", control proceeds to step S205.

In step S205, deceleration fuel cut execution determination processing is performed, and control proceeds to step S206. This fuel cut is performed to improve fuel consumption in a case where the vehicle is decelerating. The setting and resetting of the fuel cut flag F_FC is performed by this processing.

In step S206, it is determined whether the fuel cut flag F_FC is "1". In the case where the determination result is "yes", control proceeds to step S212, and in the case where the determination result is "no", control proceeds to step S207. Here, in a case where the fuel cut flag F_FC becomes "1" in deceleration mode, the fuel is cut.

In step S207, it is determined whether the all cylinder cut-off execution flag F_ALCS is "1". In the case where the determination result is "yes" (during all cylinder cut-off), control proceeds to step S212, and in the case where the determination result is "no", control proceeds to step S208.

In step S208, it is determined whether the all cylinder cut-off solenoid flag F_ALCSSOL is "1". In the case where the determination result is "yes" (all cylinder cut-off solenoid is turned on), control proceeds to step S212, and in the case where the determination result is "no", control proceeds to step S209.

Accordingly, in the case where the intake valve and exhaust valve are closed during all cylinder cut-off operation (F_ALCS=1) (step S207), and in the case where the all cylinder cut-off solenoid flag F_ALCSSOL is "1" (step S208), fuel cut is continued.

Even if the all cylinder cut-off execution flag F_ALCS becomes "0" when resuming normal operation from an all cylinder cut-off operation, during the time from when the all cylinder cut-off solenoid flag F_ALCSSOL is "0", that is the all cylinder cut-off solenoid is off, until operation is resumed completely, there is a possibility that the cylinders are cut off. Therefore, the arrangement is such that a determination of the all cylinder cut-off solenoid flag F_ALCSSOL is added in step S208, and in the case where the all cylinder cut-off solenoid flag F_ALCSSOL becomes "0", fuel cut is cancelled (F_FC=0).

In step S209, the fuel cut flag F_FC is set to "0", fuel cut is cancelled, and control terminates.

Next is a description of the operation.

In a case where the vehicle is running in a mode other than deceleration, the fuel cut flag F_FC is "0" in step S141 of FIG. 8, the all cylinder cut-off cancellation condition is satisfied (F_ALCSSTP=1), and the determination in step S106 of FIG. 6 is "yes". Accordingly, in step S120 the all cylinder cut-off execution flag F_ALCS is "0", and all cylinder cut-off is not performed.

On the other hand, when the vehicle is running in deceleration regeneration mode (deceleration regeneration permit flag F_MADECRGN=1), the fuel cut flag F_FC is "1" in step S141 of FIG. 8, and the fuel cut flag F_FC is "1" in step S212 of FIG. 9. As a result, when the previous condition of all cylinder cut-off is satisfied in step S104 of FIG. 6, and the all cylinder cut-off cancellation condition is not satisfied in step S106, the solenoid of the spool valve SV is turned on in step S109 after a predetermined time (TALCSDLY1) has passed from this point of time. Then, when the oil pressure (POIL) becomes greater than or equal to a predetermined value (#POILCSH), the all cylinder cut-off execution flag F_ALCS becomes "1" in step S113 after a further predetermined time (TCSDLY1) has passed, and the all cylinder cut-off operation is performed.

Figure 10:
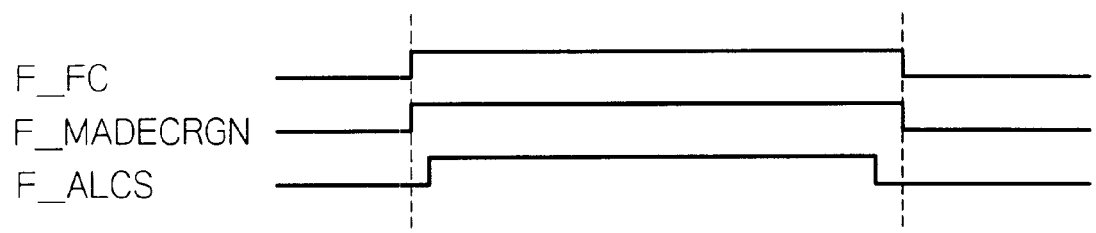
FIG. 10 is a timing chart of the embodiment of the present invention.

As a result, after the fuel cut flag F_FC and the deceleration regeneration permit flag F_MADECRGN become "1" in the timing chart of FIG. 10, the all cylinder cut-off execution flag F_ALCS becomes "1".

Then, when the all cylinder cut-off cancellation condition is satisfied during the all cylinder cut-off operation in step S106 of FIG. 6, the solenoid of the spool valve SV is turned off in step S116 after a predetermined time (TALCSDLY2) has passed from this point of time. Then, the oil pressure (POIL) becomes less than or equal to a predetermined value (#POILCSL), the all cylinder cut-off execution flag F_ALCS becomes "0" in step S120 after a further predetermined time (TCSDLY2) has passed, and normal operation is performed. Accordingly, as shown in FIG. 9, after the all cylinder cut-off execution flag F_ALCS and the all cylinder cut-off solenoid flag F_ALCSSOL become "0", then as shown by the timing chart of FIG. 10, the fuel cut flag F_FC (and deceleration regeneration permit flag F_MADECRGN) become "0", that is, fuel cut is cancelled, and normal operation is performed.

In the abovementioned embodiment, basically when all cylinder cut-off is determined by the all cylinder cut-off execution flag F_ALCS (=1) during deceleration fuel cut, cylinder cut-off operation is possible by the variable valve timing system VT. Therefore, all cylinder cut-off is performed together with cutting the fuel to limit fuel consumption, so that fuel consumption can be improved.

In a case where the cancellation of all cylinder cut-off is determined by the all cylinder cut-off execution flag F_ALCS (=0), and an inoperative state of the variable valve timing system VT is determined by the all cylinder cut-off solenoid flag F_ALCSSOL, it is possible to cancel the fuel supply to the engine and later resume it. Therefore, fuel is not supplied during all cylinder cut-off, and hence it is possible to switch from all cylinder cut-off operation to normal operation smoothly without wasting fuel.

Since the variable valve timing system VT closes both the intake valve IV and the exhaust valve EV of all cylinders, engine E pumping losses and friction when cutting off all cylinders are reduced, and it is possible to prevent fresh air from flowing into the exhaust system. Therefore, the efficiency of the power transmission is not reduced significantly, temperature drop in the catalytic device is prevented compared with the case where fresh air is introduced, and hence fuel consumption can be greatly improved while optimally controlling the exhaust gas.

Here all cylinder cut-off (step S137, step S113) results only in the case where the voltage VB of the auxiliary battery 4, being the drive source voltage for the aforementioned solenoid valve SV, or the oil temperature TOIL of the working fluid, satisfy certain conditions (step S135, step S136). Therefore, it is possible to prevent failures arising such as where all cylinder cut-off is performed in the case where these conditions are not satisfied, that is failures where there is a drop in response due to the oil temperature TOIL being too low, or the oil pressure response is poor with the oil temperature TOIL being too high, or the poor operation of the variable valve timing mechanism VT in the case where the voltage VB of the auxiliary battery 4 is low.

Moreover, since all cylinder cut-off is possible at a time of low engine load (step S131) when the inlet pipe negative pressure PGBA is greater than or equal to a predetermined value that is on the atmospheric pressure side, it is not necessary to cut off the cylinders at a time of high engine load when all cylinder cut-off is not required.

Furthermore, since the all cylinder cut-off is cancelled in the case where the remaining charge QBAT of the battery 3 is outside of a predetermined range (step S151), failure occurring through being unable to ensure sufficient energy for motor assistance at the time of returning to normal operation, in the case where the remaining battery charge is too low is prevented. Moreover, extra regeneration is not required in the case where the remaining battery charge is too high. Therefore, there is an advantage in energy management.

Furthermore, in the case where the previous gear position NGR is less than or equal to a predetermined value, that is on the low speed side (step S144), all cylinder cut-off cancellation results. Therefore regeneration in a region where regeneration efficiency is poor can be avoided, and it is possible to avoid the busy operation due to cylinder cut-off switching in a low speed region.

Moreover, in the case where the rate of change DNE of the engine speed NE is greater than or equal to a predetermined value (step S146), the all cylinder cut-off cancellation results. Therefore, stalling the engine in the case where the rate of change of engine speed on the decreasing side is greater than or equal to a predetermined value, for example as in the case where a sudden deceleration is performed to stop a vehicle, can be prevented, enabling switching to normal operation.

Furthermore, in a case where the clutch of a manual transmission vehicle is determined to be partially engaged (step S145), all cylinder cut-off cancellation results. Therefore stalling the engine, for example in the case where the clutch is partially engaged in order to stop the vehicle, can be prevented. Moreover, unnecessarily cutting off the cylinders if the gears are changed to accelerate, can be prevented, enabling switching to normal operation.

Although it is assumed in the abovementioned embodiment that the engine E performs all cylinder cut-off operations in which all cylinders are cut off, it is possible to construct the engine E so as to perform a partial cylinder cut-off operation in which only some of the cylinders are cut-off.

What is claimed is:

1. A control apparatus for a hybrid vehicle with an engine capable of cutting off cylinders and a motor as drive sources of the vehicle, which performs regenerative braking by the motor depending on a deceleration state when the vehicle is decelerating, comprising:

a cylinder cut-off determination section which determines whether the cylinders should be cut off depending on the running conditions of the vehicle;

a cylinder cut-off cancellation determination section which determines whether the cylinder cut-off should be cancelled, depending on the running conditions of the vehicle while the operation of the cylinders of the engine is cut off;

a cylinder cut-off execution section which operates an actuator for cutting off the cylinder operation of the engine when cylinder cut-off is determined to be possible by the cylinder cut-off determination section; and a cylinder cut-off control section which cuts off the cylinders of the engine based on the operating conditions of the cylinder cut-off determination section, the cylinder cut-off cancellation determination section and the cylinder cut-off execution section, wherein when a voltage of a drive source of the actuator that is operated by the cylinder cut-off execution section is greater than or equal to a predetermined voltage, and a temperature of a medium that acts by the operation of the actuator is within a predetermined range, the cylinder cut-off determination section determines that cylinder cut-off is possible.

2. A control apparatus for a hybrid vehicle according to claim 1, wherein the cylinder cut-off execution section applies an oil pressure of a working fluid by operating the actuator, to close both an intake valve and exhaust valve of the engine, and the temperature of the medium is the oil temperature of the working fluid.

3. A control apparatus for a hybrid vehicle according to claim 2, wherein the cylinder cut-off cancellation determination section determines that cylinder cut-off cancellation is possible when the oil pressure of the working fluid is less than or equal to a predetermined pressure.

4. A control apparatus for a hybrid vehicle according to claim 1, wherein when an inlet negative pressure of an inlet pipe is greater than or equal to a predetermined value that is on the atmospheric pressure side, the cylinder cut-off determination section determines that cylinder cut-off is possible.

5. A control apparatus for a hybrid vehicle according to claim 1, wherein the cylinder cut-off cancellation determination section determines that cylinder cut-off cancellation is possible when the remaining charge of a battery that drives the motor is outside of a predetermined range.

6. A control apparatus for a hybrid vehicle according to claim 1, wherein the cylinder cut-off cancellation determination section determines that cylinder cut-off cancellation is possible when a gear ratio is less than or equal to a predetermined value, that is on the low speed side.

7. A control apparatus for a hybrid vehicle according to claim 1, wherein the cylinder cut-off cancellation determination section determines that cylinder cut-off cancellation is possible when the rate of change of the engine speed is greater than or equal to a predetermined value.

8. A control apparatus for a hybrid vehicle according to claim 1, wherein the cylinder cut-off cancellation determination section determines that cylinder cut-off is possible when a clutch of a manual transmission vehicle is determined to be partially engaged.

9. A control apparatus for a hybrid vehicle according to claim 1, wherein the cylinder cut-off determination section determines that cylinder cut-off is possible when an outside air temperature is within a predetermined range.

10. A control apparatus for a hybrid vehicle according to claim 1, wherein the cylinder cut-off determination section determines that cylinder cut-off is possible when a cooling water temperature is within a predetermined range.

11. A control apparatus for a hybrid vehicle according to claim 1, wherein the cylinder cut-off determination section determines that cylinder cut-off is possible when atmospheric pressure is greater than or equal to a predetermined pressure.

12. A control apparatus for a hybrid vehicle according to claim 1, wherein the cylinder cut-off cancellation determination section determines that cylinder cut-off cancellation is possible when vehicle speed is outside of a predetermined range.

13. A control apparatus for a hybrid vehicle according to claim 1, wherein the cylinder cut-off cancellation determination section determines that cylinder cut-off cancellation is possible when engine speed is outside of a predetermined range.

14. A control apparatus for a hybrid vehicle according to claim 1, wherein the cylinder cut-off cancellation determination section determines that cylinder cut-off cancellation is possible when brake master power internal negative pressure is greater than or equal to a predetermined value.

15. A control apparatus for a hybrid vehicle according to claim 1, wherein the cylinder cut-off cancellation determination section determines that cylinder cut-off cancellation is possible when a throttle is not fully closed.

* * * * *